E. PASSBURG.
PROCESS OF DRYING FISH.
APPLICATION FILED DEC. 24, 1908.
987,394.
Patented Mar. 21, 1911.
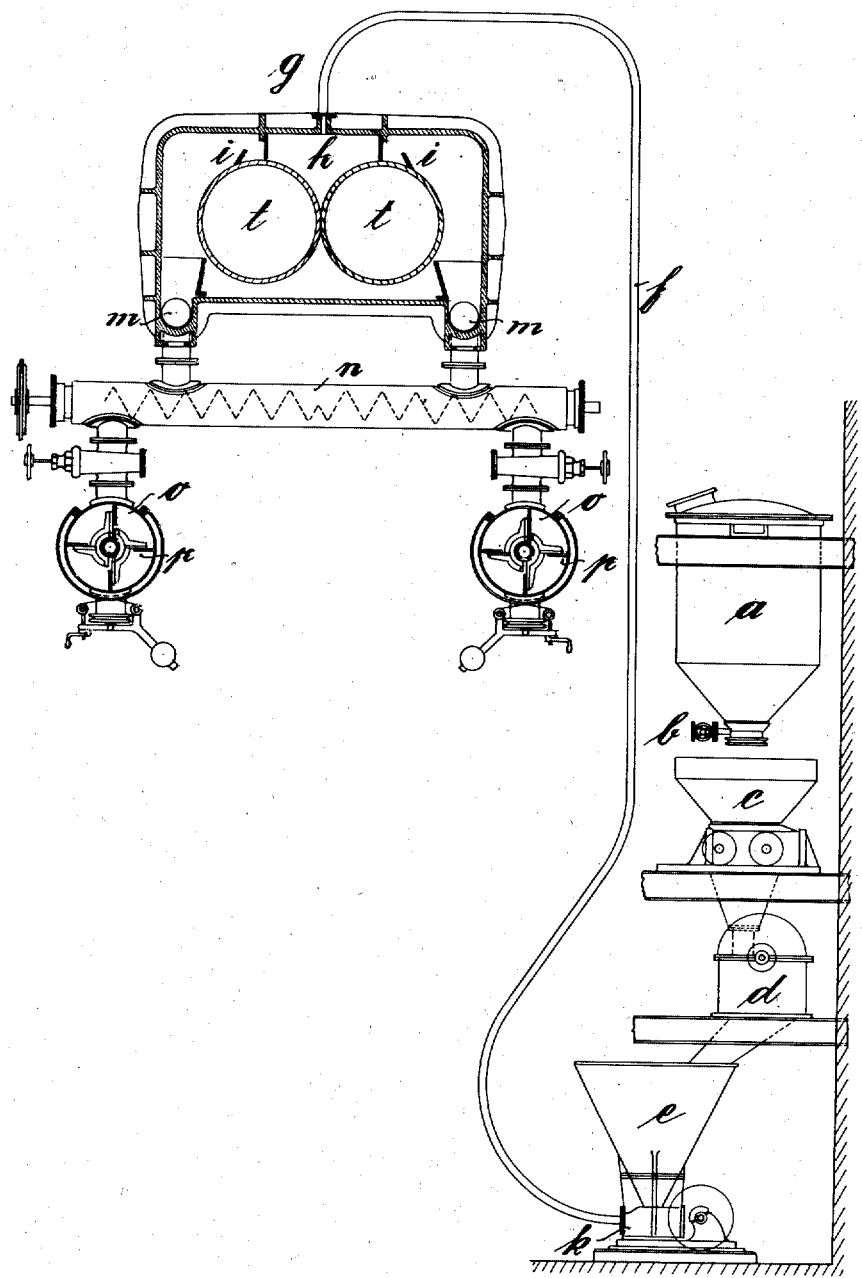
Witnesses:
Edna J. Gockel.
J. Waldo Chrisinger.
Inventor:
Emil Passburg,
By Hugh K. Wagner,
His Attorney.

UNITED STATES PATENT OFFICE.

EMIL PASSBURG, OF BERLIN, GERMANY.

PROCESS OF DRYING FISH.

987,394.  Specification of Letters Patent.  Patented Mar. 21, 1911.

Application filed December 24, 1908. Serial No. 469,109.

*To all whom it may concern:*

Be it known that I, EMIL PASSBURG, a citizen of the Empire of Germany, residing at 30 Brücken Allee, Berlin, in said Empire of Germany, have invented a certain new and useful Improved Process of Drying Fish, of which the following is a specification.

This invention relates to an improved process for drying fish.

The object of the invention is to produce a drying process which effectually dries the fish without producing odor, which latter is offensive and objectionable, as is well known.

Further and other objects will later appear.

In the drawings, the figure shows an apparatus in side elevation partly in section by use of which the invention may be practiced.

The process is carried out as follows: The fish or its parts is placed in the steam-boiler $a$ and is there heated by means of steam, in order to sterilize the mass and to soften same. If the substance of the fish is such that it can be reduced to a paste without being steamed, the steaming can of course be omitted. After the steaming the greasy water produced can be separately drawn off from the boiler $a$ through a valve $b$ leading to the boiler $a$ into a reducing-mill $d$, after the fish has, if necessary, been passed through a reducing device $c$. The wet fish reduced by the mill $d$ to a paste falls through suitable pipes or the like into a vessel $e$ from whence the paste is either directly sucked in by the vacuum in the drier $g$ through the pipe $f$ or admitted into a piston-press $k$ which forces the wet material into the drier $g$.

The drier consists of two or more drying-drums $t$, which can be heated by steam and rotate in preferably opposite directions. The drums are arranged in a chamber $h$ so constructed that air can be exhausted therefrom. The drums $t$ roll the fish, introduced into the chamber in the form of a paste, into a thin layer, and dry it to such degree that it is no longer sticky, and upon being removed from the drums by scrapers $i$, it readily enters the worm-channels $m$ or the heating-pipes of the finishing drier.

The worms $n$ feed the material into the second or finishing drier $o$ which latter is provided with stirrers of any suitable construction, as $p$. For instance, as shown in the drawing, the second drying apparatus may consist of one or more cylindrical steam jacketed vessel $o$, in which stirring devices $p$ stir the partially dried fish *in vacuo*, until same has reached the degree of dryness required.

The dried fish is removed from the second drying apparatus by manipulating a suitable valve on one of the vessels, so that the latter can be emptied and air may have access therein, while the other one remains *in vacuo*, and receives the substance from the first drier, so that the drying treatment is not interrupted in the primary drying apparatus which can remain *in vacuo*.

I am aware that other food stuffs have been pulped and dried *in vacuo* in thin layers on drying cylinders also that two stage vacuum drying by means of apparatus comprising a drum and stirrer is not in itself novel and I lay no claim to such features broadly.

Since the steaming takes place in a closed vessel the vapor arising from the fish when the steaming occurs will mingle with the steam and will be condensed with same. As the drying occurs in apparatus under *vacuo* no odor given off by the mass during the drying can escape.

What I claim is:—

A process of treating fish which consists in reducing the fish to a paste, subjecting the paste to a partial drying treatment *in vacuo*, transforming said paste into a thin layer during said partial drying treatment, subjecting said paste to a finishing drying treatment *in vacuo*, and subjecting the paste to the action of heat and mechanical agitation during the finishing drying treatment, the fish to be treated remaining always *in vacuo*.

In testimony whereof I affix my signature in presence of two witnesses.

EMIL PASSBURG.

Witnesses:
 HENRY HASPER,
 WOLDEMAR HAUPT.